United States Patent
Inokuchi

(10) Patent No.: US 11,503,060 B2
(45) Date of Patent: Nov. 15, 2022

(54) INFORMATION PROCESSING APPARATUS, INFORMATION PROCESSING SYSTEM, SECURITY ASSESSMENT METHOD, AND SECURITY ASSESSMENT PROGRAM

(71) Applicant: NEC CORPORATION, Tokyo (JP)

(72) Inventor: Masaki Inokuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 16/651,759

(22) PCT Filed: Sep. 29, 2017

(86) PCT No.: PCT/JP2017/035714
§ 371 (c)(1),
(2) Date: Mar. 27, 2020

(87) PCT Pub. No.: WO2019/064580
PCT Pub. Date: Apr. 4, 2019

(65) Prior Publication Data
US 2020/0259855 A1 Aug. 13, 2020

(51) Int. Cl.
*H04L 9/40* (2022.01)
*G06N 7/00* (2006.01)
(52) U.S. Cl.
CPC ......... *H04L 63/1433* (2013.01); *G06N 7/005* (2013.01)
(58) Field of Classification Search
CPC .................... H04L 63/1433; G06N 7/005
See application file for complete search history.

(56) References Cited

U.S. PATENT DOCUMENTS 9,338,181 B1 * 5/2016 Burns ................ H04L 63/1433
2002/0147803 A1 * 10/2002 Dodd ................ H04L 63/1433
726/25

(Continued)

FOREIGN PATENT DOCUMENTS

JP 2011-028613 A 2/2011
JP 2016-218695 A 12/2016

(Continued)

OTHER PUBLICATIONS

International Search Report for PCT/JP2017/035714 dated Jan. 9, 2018 [PCT/ISA/210].

(Continued)

*Primary Examiner* — Hee K Song
(74) *Attorney, Agent, or Firm* — Sughrue Mion, PLLC

(57) ABSTRACT

To implement a security assessment system capable of assessing an attack path including an air gap path, there is provided an information processing apparatus including a system configuration detector that detects at least two hosts included in a system and a communication link between the at least two hosts, an air gap path detector that detects, among the at least two hosts, a pair of hosts between which there is no communication link but data movement can occur, a calculator that calculates a score concerning a possibility that the pair of hosts detected by the air gap path detector is used for an attack, and a security assessment unit that performs security assessment using the hosts, the communication link between the hosts, information of the pair of hosts, and the score.

9 Claims, 15 Drawing Sheets

(56) References Cited

U.S. PATENT DOCUMENTS

| | | | |
|---|---|---|---|
| 2008/0025229 A1* | 1/2008 | Beliles | H04L 63/1433 |
| | | | 370/252 |
| 2016/0232356 A1* | 8/2016 | Barkelew | G06F 9/4401 |
| 2017/0244740 A1* | 8/2017 | Mahabir | H04L 63/1433 |

FOREIGN PATENT DOCUMENTS

| | | |
|---|---|---|
| JP | 2017-091493 A | 5/2017 |
| WO | 2012/132125 A1 | 10/2012 |

OTHER PUBLICATIONS

Written Opinion for PCT/JP2017/035714 dated Jan. 9, 2018 [PCT/ISA/237].

* cited by examiner

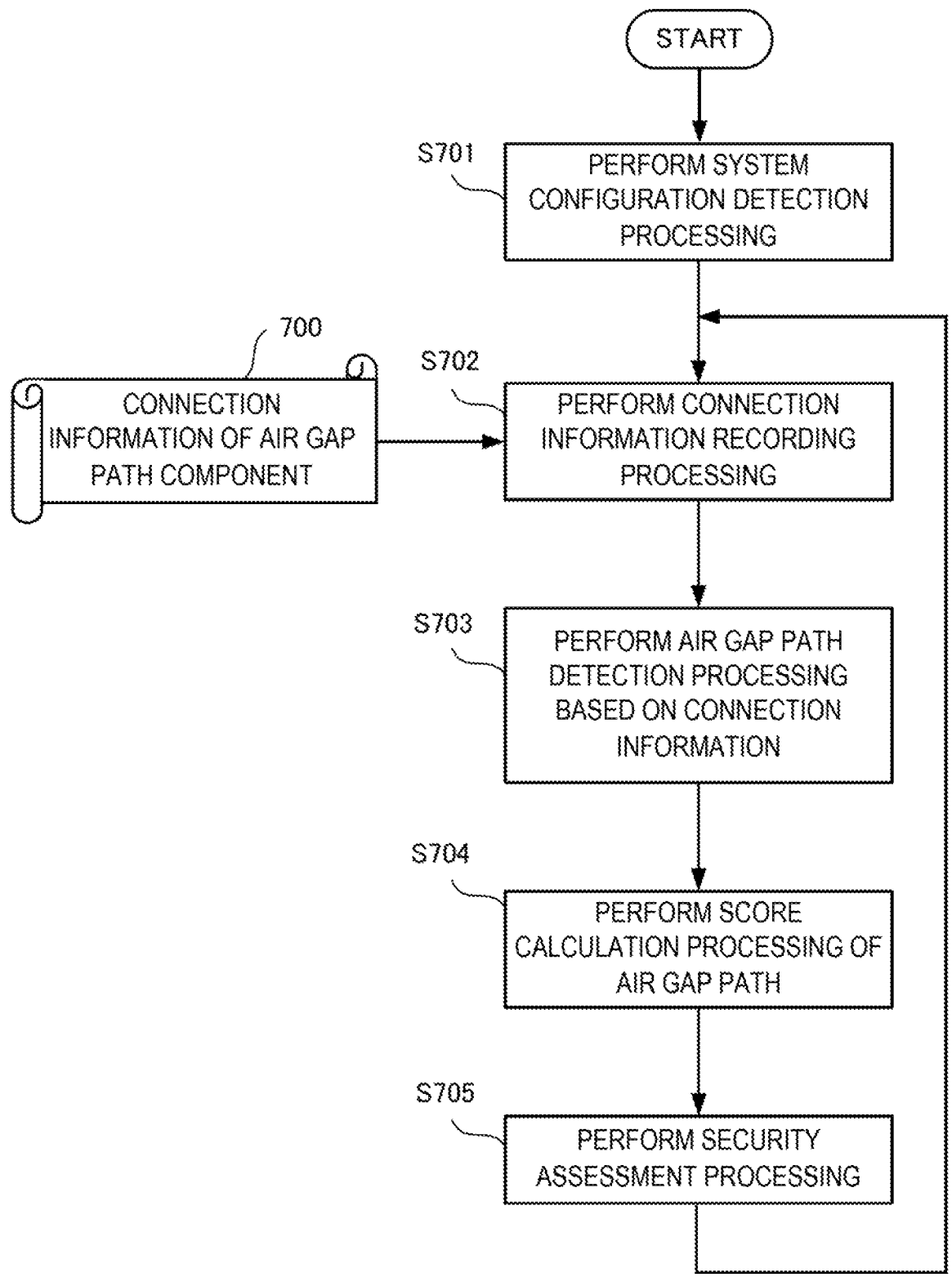
F I G. 7

900

| AIR GAP PATH COMPONENT IDENTIFIER | HOST IDENTIFIER |
|---|---|
| X | A |
| Y | C |
| X | D |
| Y | B |
| X | D |
| X | E |

FIG. 9

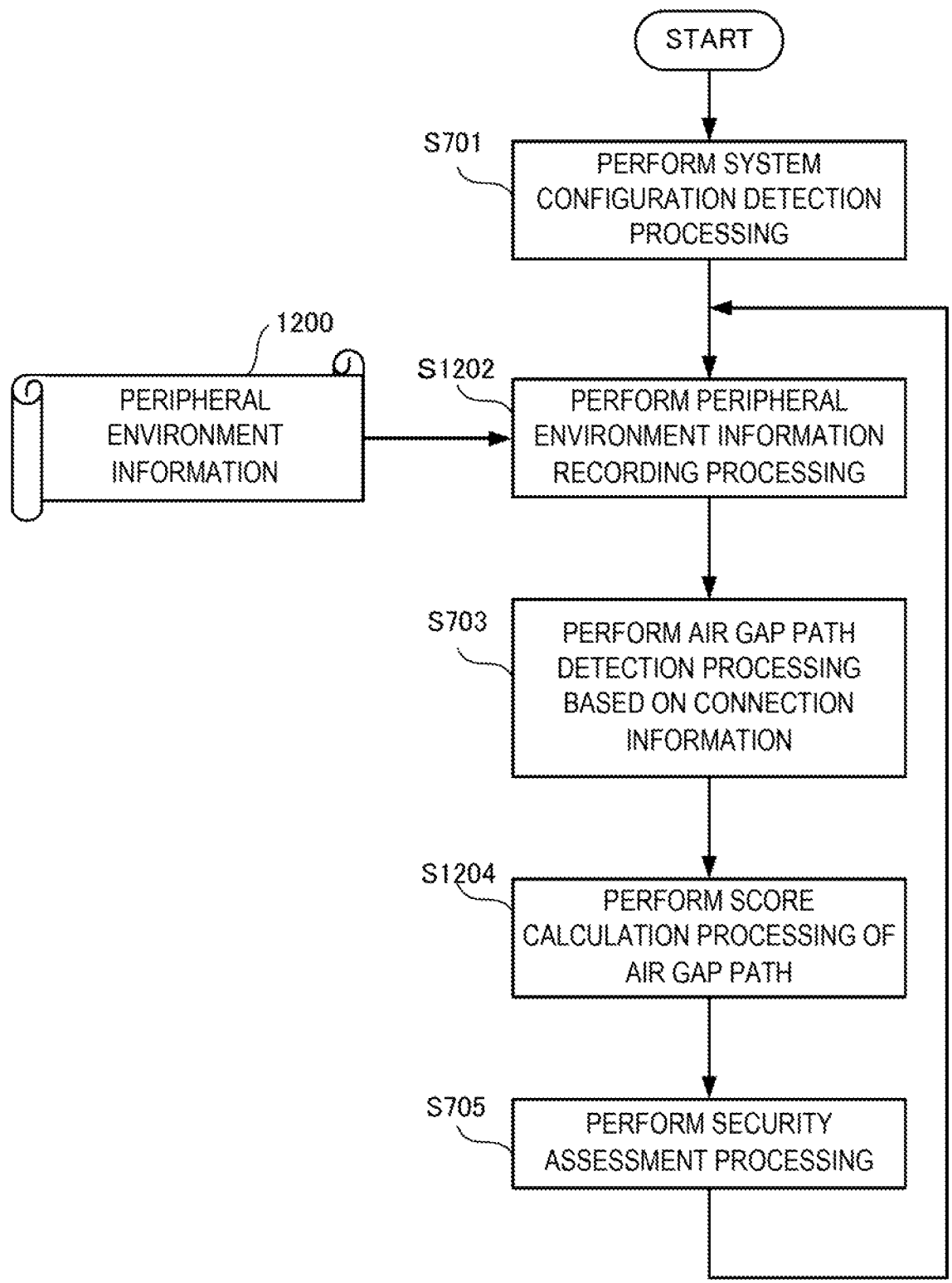
F I G. 12

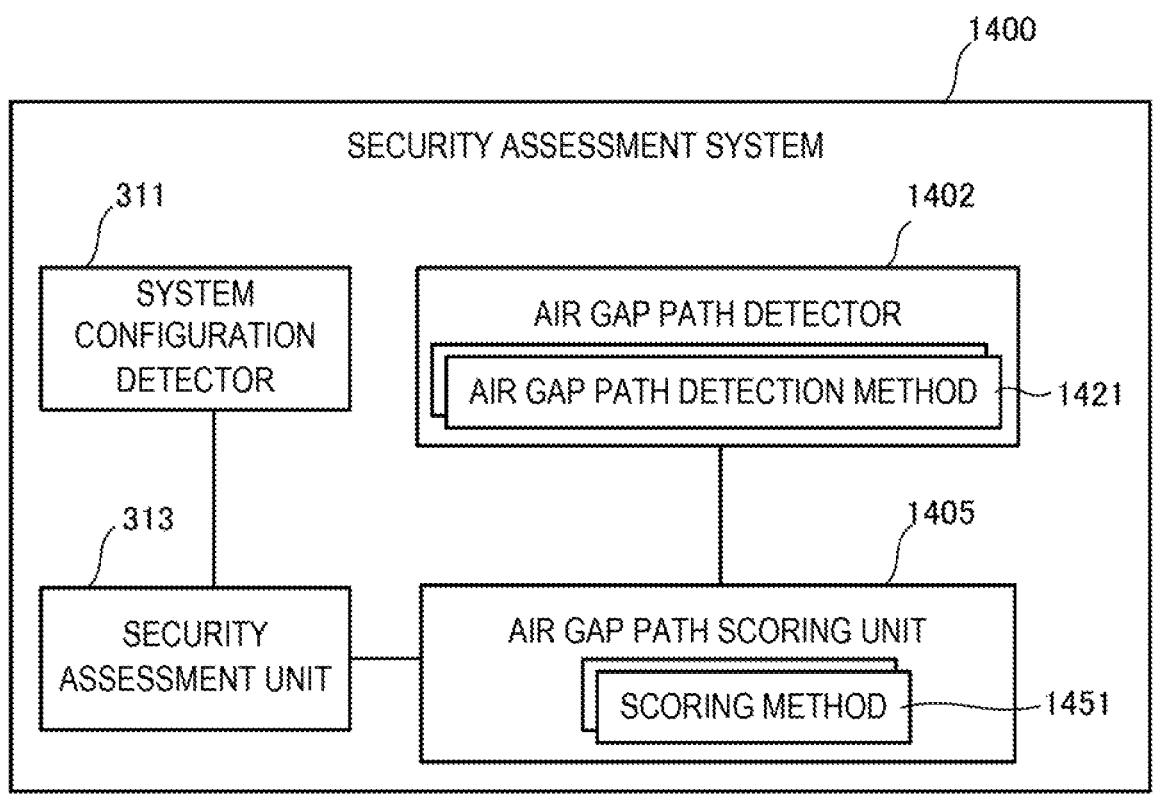
F I G. 14

INFORMATION PROCESSING APPARATUS, INFORMATION PROCESSING SYSTEM, SECURITY ASSESSMENT METHOD, AND SECURITY ASSESSMENT PROGRAM

CROSS REFERENCE TO RELATED APPLICATIONS

This application is a National Stage of International Application No. PCT/JP2017/035714 filed Sep. 29, 2017.

TECHNICAL FIELD

The present invention relates to an information processing apparatus, an information processing system, a security assessment method, and a security assessment program.

BACKGROUND ART

In the above technical field, a paragraph [0064] and FIG. 5 of patent literature 1 disclose a security monitoring apparatus that monitors and detects a security problem such as vulnerability including malware infection, a virus, an illegal behavior in a networking environment, or a problem with IT asset management, and automatically isolates and monitors a terminal.

CITATION LIST

Patent Literature

Patent literature 1: Japanese Patent Laid-Open No. 2017-091493

SUMMARY OF THE INVENTION

Technical Problem

In the technique described in the above literature, however, it is impossible to perform assessment in consideration of a situation in which a host that cannot be reached no matter how communication links existing on a network are followed is attacked from a given host.

The present invention provides a technique of solving the above-described problem.

Solution to Problem

One example aspect of the present invention provides an information processing apparatus comprising:

a system configuration detector that detects at least two hosts included in a system and a communication link between the at least two hosts;

an air gap path detector that detects, among the at least two hosts, a pair of hosts between which there is no communication link but data movement can occur;

a calculator that calculates a score concerning a possibility that the pair of hosts detected by the air gap path detector is used for an attack; and a security assessment unit that performs security assessment using the hosts, the communication link between the hosts, information of the pair of hosts, and the score.

Another example aspect of the present invention provides a security assessment method comprising:

detecting at least two hosts included in a system and a communication link between the at least two hosts;

detecting a pair of hosts between which there is no communication link but data movement can occur, among the at least two hosts;

calculating a score concerning a possibility that the pair of hosts detected in the detecting the pair of hosts is used for an attack; and performing security assessment using the hosts, the communication link between the hosts, information of the pair of hosts, and the score.

Still other example aspect of the present invention provides a security assessment program for causing a computer to execute a method, comprising:

detecting at least two hosts included in a system and a communication link between the at least two hosts;

detecting a pair of hosts between which there is no communication link but data movement can occur, among the at least two hosts;

calculating a score concerning a possibility that the pair of hosts detected in the detecting the pair of hosts is used for an attack; and performing security assessment using the hosts, the communication link between the hosts, information of the pair of hosts, and the score.

Advantageous Effects of Invention

According to the present invention, it is possible to implement a security assessment system capable of assessing an attack path including an air gap path in consideration of priority.

BRIEF DESCRIPTION OF DRAWINGS

FIG. 7 is a flowchart illustrating the processing procedure of the security assessment system according to the second example embodiment of the present invention;

FIG. 9 is a table showing an example of connection information of the air gap path component in the security assessment system according to the second example embodiment of the present invention;

FIG. 12 is a flowchart illustrating the processing procedure of the security assessment system according to the third example embodiment of the present invention;

FIG. 14 is a block diagram showing the configuration of a security assessment system according to the fourth example embodiment of the present invention.

DESCRIPTION OF EXAMPLE EMBODIMENTS

Figure 1:
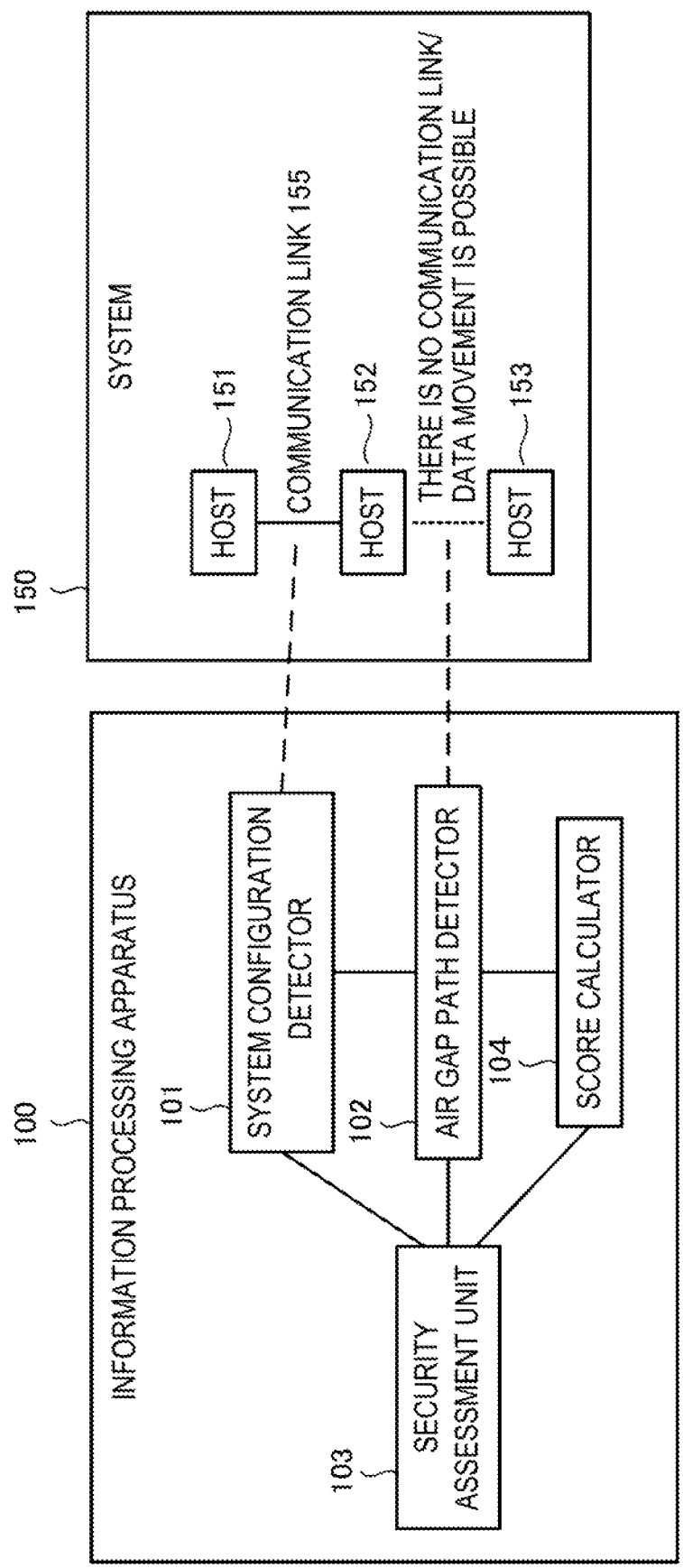
FIG. 1 is a block diagram showing an example of a security assessment system according to the first example embodiment of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment (Technical Premise)

In general, if a host accessible by an attacker in an initial state is different from a host as an attack target of the attacker, the attacker attacks the host as the attack target via a plurality of hosts in a system. Thus, it is necessary to be able to assess an attack via the plurality of hosts even in security assessment.

An existing security assessment system provides a function of extracting an order (attack path) in which hosts existing on a network in the system are attacked, and estimating a required attack time and the degree of possibility that an attack is made, and estimating damage if an attack is made. A communication link existing on the network may be wired or wireless.

A host that can be reached by following communication links on the network will simply be referred to as a "normal reachable host" hereinafter. Similarly, a host that cannot be reached no matter how communication links are followed will simple be referred to as a "normal unreachable host" hereinafter.

In the existing security assessment system, even if a given host is attacked and under the control of an attacker, this host cannot communicate with a normal unreachable host, and it is thus determined that no attack can be made.

In fact, however, an attack action of spreading malware infection via a portable storage medium or the like can be performed. For example, even if hosts A and B exist and there is no connection between hosts A and B on the network, if there exists a storage medium (a USB memory or the like) connected to both hosts A and B, malware infection may spread from one host to the other host via the storage medium. Note that in this specification, a path between hosts connected by a temporarily connected medium will be referred to as an "air gap path" hereinafter. A path between hosts connected by some communication link will be referred to as a "normal path" hereinafter.

No air gap path appears in network configuration information and the like collected from an actual apparatus, and thus the existing security assessment system cannot consider the air gap path. Especially, the existing security assessment system cannot consider the possibility that an air gap path is used for an attack.

Note that an air gap path can generally exist between normal reachable hosts. For example, when there exist hosts A and B between which some communication link exists, if there exists a storage medium connected to both hosts A and B, both a normal path and an air gap path exist between hosts A and B.

(Information Processing Apparatus)

An information processing apparatus 100 according to the first example embodiment of the present invention will be described with reference to FIG. 1. The information processing apparatus 100 is an apparatus that assesses and evaluates a security state in a system.

As shown in FIG. 1, the information processing apparatus 100 includes a system configuration detector 101, an air gap path detector 102, a security assessment unit 103, and a score calculator 104.

The system configuration detector 101 detects at least two hosts 151 to 153 included in a system 150, and a communication link 155 between at least two hosts 151 and 152.

The air gap path detector 102 detects, among the at least two hosts 151 to 153, a pair of the hosts 152 and 153 between which there is no communication link but data movement may occur.

The score calculator 104 calculates a score concerning the possibility that the pair of the hosts 152 and 153 detected by the air gap path detector 102 is used for an attack.

The security assessment unit 103 performs security assessment using the detection result by the system configuration detector 101, the detection result by the air gap path detector 102, and the score calculated by the score calculator 104.

As described above, assessment can be performed in consideration of the possibility that a host that cannot be reached no matter how communication links existing on the network are followed is attacked from a given host.

Second Example Embodiment

A security assessment system according to the second example embodiment of the present invention will be described next with reference to FIGS. 2 to 6.

(Overview of Second Example Embodiment)

The security assessment system according to this example embodiment scores, based on characteristics such as the connection frequency/connection time of an air gap path, the possibility that the air gap path is used for an attack.

Note that in the following description, for the sake of simplicity, as the possibility that the air gap path is used for an attack is higher, the score is higher. However, this is not intended to limit the present invention. By processing of inverting the sign, a score obtained by an example of scoring to be described below can readily be made higher as the possibility that an air gap path is used for an attack is lower.

(Configuration of System as Evaluation Target)

Figure 2:
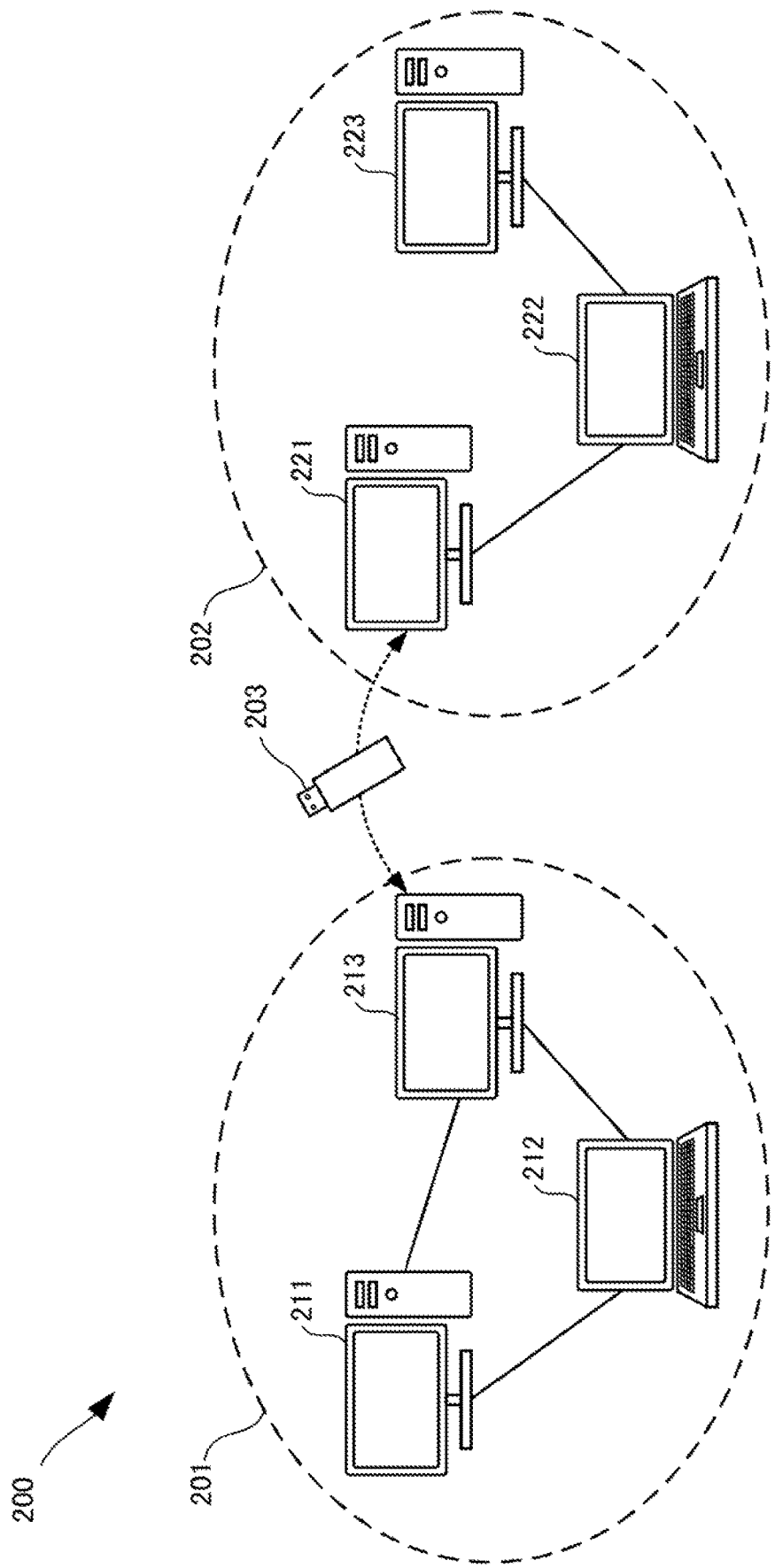
FIG. 2 is a view showing the configuration of a system as an evaluation target of a security assessment system according to the second example embodiment of the present invention.

FIG. 2 is a view for explaining the configuration of a system 200 as an evaluation target of the security assessment system according to this example embodiment.

In this example, the system 200 as an assessment target includes host groups 201 and 202 each including normal reachable hosts. The host group 201 includes hosts 211 to 213, and the host group 202 includes hosts 221 to 223. The system 200 further includes an air gap path component 203. The hosts 211 to 213 in the normal reachable host group 201 are hosts that can reach each other by following communication links between the hosts. The same applies to the normal reachable host group 202, and the hosts 221 to 223 can reach each other by following communication links. There is no communication link between the host of the host group 201 and the host of the host group 202 regardless of wired or wireless connection. However, the air gap path component 203 connected to both the hosts 213 and 221 exists between them.

The hosts 211 to 213 and 221 to 223 are typically computers such as a PC and a server or network devices such as a firewall and a switch but are not limited to them, and may be peripheral devices such as a printer and a mouse or industrial control devices. The air gap path component 203 is typically a storage medium such as a USB memory but is not limited to this.

The security assessment system aims at making it possible to assess an attack path including an air gap path. For example, the host 211 is connected to an external network, and an attack path such that a target attack action is made in the host 223 by following 211→213→221→222→223 is assessed. In this case, 213→221 is an air gap path, and is not considered in existing security assessment. Especially, it should be considered that the normal path and the air gap path are different in terms of a property related to easiness of an attack. For example, while the normal path is generally connected all the time, the air gap path is only connected temporarily. Therefore, in order for malware to spread infection using the air gap path, it is necessary to hide and stand by in a host connected to the air gap path until the air gap path component 203 is connected, and it may become difficult to make an attack, as compared with the normal path. Conversely, since the air gap path component 203 can be connected to a number of hosts, it may become easy to use the air gap path for an attack, as compared with the normal communication link.

In the following description, when a host is simply referred to, the host indicates one of the hosts included in the system 200 as an assessment target.

(Configuration of Security Assessment System)

Figure 3:
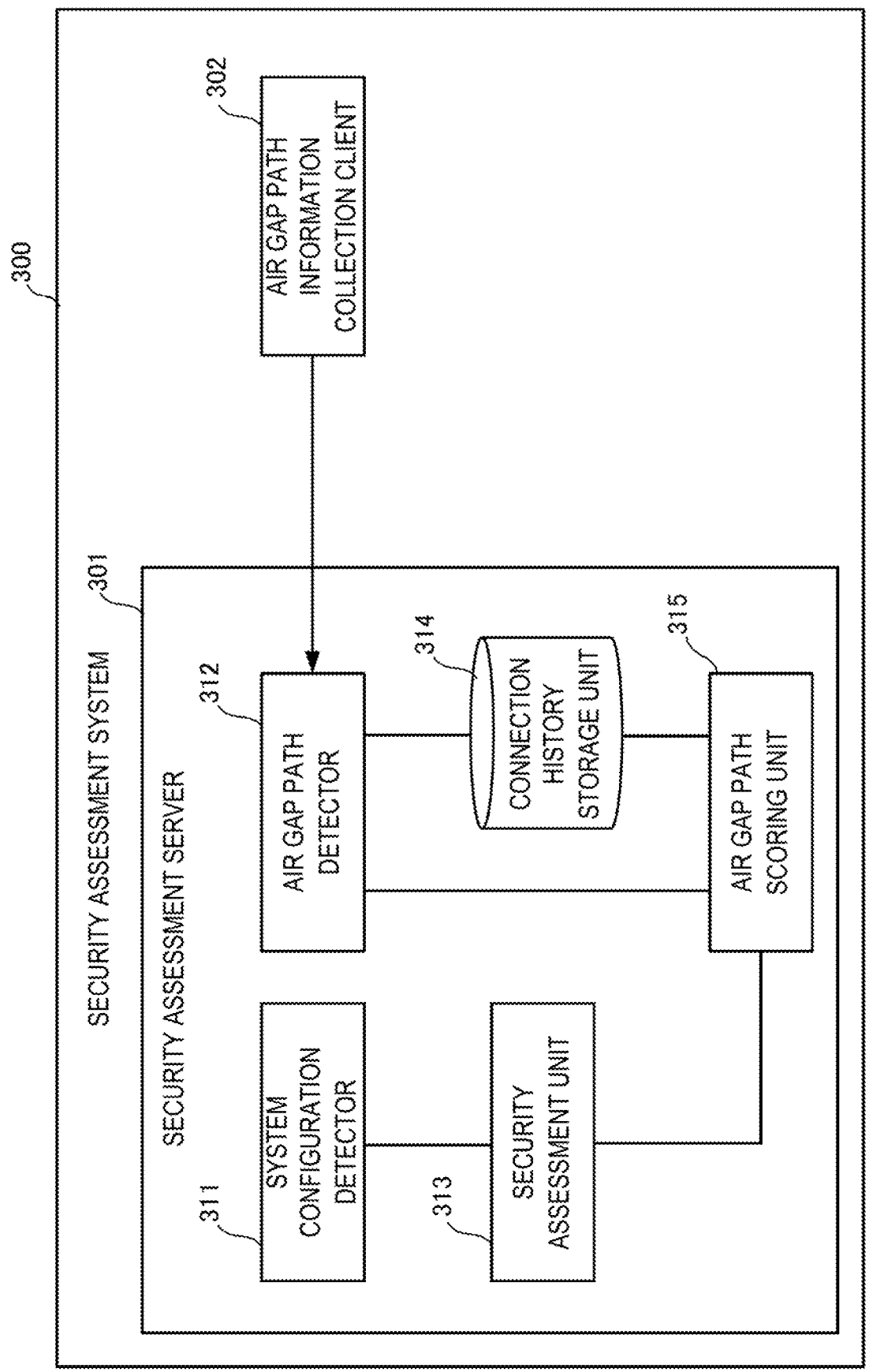
FIG. 3 is a block diagram showing the configuration of the security assessment system according to the second example embodiment of the present invention.
Figure 4:
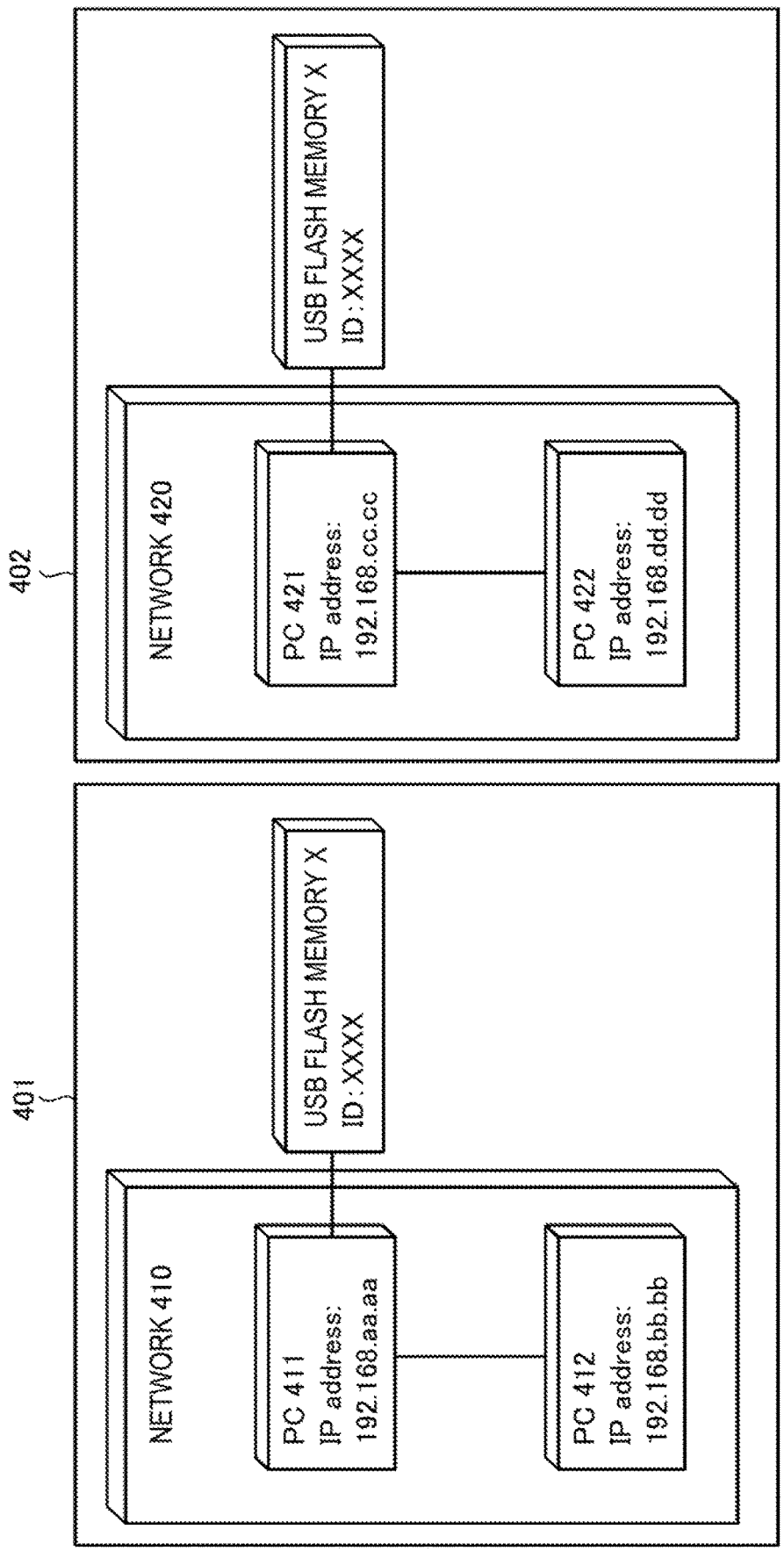
FIG. 4 is a view showing a system layout used as an input document in the security assessment system according to the second example embodiment of the present invention.

FIG. 3 shows an example of the configuration of a security assessment system 300. The security assessment system 300 includes a security assessment server 301 and an air gap path information collection client 302. The security assessment server 301 includes a system configuration detector 311, an air gap path detector 312, a security assessment unit 313, a connection history storage unit 314, and an air gap path scoring unit 315.

The air gap path information collection client 302 is typically agent software installed in a host. In the following explanation, a case in which the air gap path information collection client 302 is agent software installed in a host will be described. The present invention, however, is not limited to this.

The air gap path information collection client 302 has a function of detecting connection of the air gap path component 203 and notifying the air gap path detector 312 of connection information of the air gap path component 203. More specifically, if it is detected that the air gap path component 203 is connected to the host in which the air gap path information collection client 302 is installed, the air gap path detector 312 is notified of information including at least the identification information of the air gap path component 203 and the identification information of the host as connection information of the air gap path component 203.

Furthermore, the air gap path information collection client 302 collects additional information concerning connection of the air gap path component 203. Examples of the additional information are a time stamp of time at which the air gap path component 203 is connected, a connection period, and information of the type of a connected device. The air gap path detector 312 is notified of the collected additional information as part of connection information. The information can be used for scoring of the air gap path scoring unit 315. Since the collected additional information depends on the processing of the air gap path scoring unit 315, it will be described again in an explanation of the air gap path scoring unit 315.

Note that if there is provided a system of detecting connection of an external storage medium or the like by an existing security tool or configuration management tool and collecting the information, the collected information may be used. Alternatively, information of a system that records an operation history of an operator may be used.

The system configuration detector 311 detects the configuration of a target system to undergo security assessment. The system configuration detector 311 detects at least hosts included in the assessment target system and a network configuration (the connection relationship between the hosts). By using the detected information, it is possible to determine the normal reachable host group 201. The security assessment unit 313 is notified of the information detected by the system configuration detector 311. In addition, the system configuration detector 311 may collect further information to be used for security assessment. For example, the system configuration detector 311 can collect information of software operating on each host, the version of the software, data saved in each host, credential information, a host accessed by the software of each host, a protocol between the hosts, the configuration information of the protocol, and the like. In addition, the system configuration detector 311 can collect information indicating whether each host is connected to an external network, as needed.

The system configuration detector 311 is implemented by various implementation methods but can typically be implemented by introducing agent software (not shown) into each host. The agent software installed in each host notifies the security assessment system 300 of information of the host and its adjacent host with which the host can communicate. Although not shown in FIG. 3, an interface that allows the user to input a system configuration may be provided. Furthermore, it is possible to obtain information from an existing configuration management system.

On the other hand, the system configuration detector 311 may detect a system configuration from a document concerning system specifications. That is, the existence of each host (PC 411, 412, 421, or 422), its identification information (device name or IP address), and a connection relationship may be detected as the system configuration from a layout 401 or 402 shown in FIG. 4. This collects information only from an input document, and it is thus possible to prevent the communication load of information collection on the actual system.

The air gap path detector 312 obtains the connection information of the air gap path component 203 from the air gap path information collection client 302, and stores it in the connection history storage unit 314. Furthermore, the air gap path detector 312 detects an air gap path based on information already stored in the connection history storage unit 314, and notifies the air gap path scoring unit 315 of the air gap path.

More specifically, if the air gap path detector 312 obtains the connection information of the air gap path component 203 from the air gap path information collection client 302, it stores the information in the connection history storage unit 314. At the same time, the air gap path detector 312 acquires, from the connection history storage unit 314, past connection information of the air gap path component having information of the same identification information of the air gap path component 203 as that of the air gap path component 203 included in the stored information. That is, the identification information of the host to which the same air gap path component 203 was connected in the past is obtained.

The air gap path detector 312 detects an air gap path by assuming the existence of the air gap path between the host whose identification information is included in the connection information obtained from the air gap path information collection client 302 and the host whose identification information is included in the connection information obtained from the connection history storage unit 314. The air gap path scoring unit 315 is notified of information of the detected air gap path. The notified information of the air gap path includes at least the pieces of identification information of the hosts forming the air gap path and the identification information of the air gap path component 203.

There are various kinds of air gap path components 203. Any device having a storage function and capable of exchanging information with a host can serve as the air gap path component 203. Practical examples are a USB memory, a memory card such as an SD memory card, an external hard disk, an optical medium such as a CD or DVD, a laptop personal computer, a smartphone, a tablet, a digital camera, and a portable music player. A peripheral device such as a printer or a mouse or an industrial control device can also serve as the air gap path component 203. These devices are merely examples, and the present invention is not limited to them.

The air gap path may not include the air gap path component 203. That is, the hosts are connected directly by a cable without intervention of a storage medium or the hosts are temporarily connected by the Wi-Fi tethering function or the like. When the hosts are stationarily connected, no air gap path is formed. However, a path between the hosts that are temporarily connected by a system user, as needed, can be an air gap path. Such air gap path is also missed by the existing security assessment system.

If the air gap path component is not included, the connection information of which the air gap path information collection client 302 notifies the air gap path detector 312 includes no identification information of the air gap path component 203. In this case, the air gap path scoring unit 315 can calculate a score using not the connection frequencies between the air gap path component 203 and the hosts 213 and 221 but the connection frequency between the pair of the hosts 213 and 221 forming the air gap path. In other modifications and example embodiments to be described later, as long as a feature concerning the air gap path component 203 is not used, it is possible to make a similar change so as to score the air gap path with no air gap path component 203.

Note that it is also possible to determine an air gap path by regarding the air gap path component 203 as a host.

Figure 5:
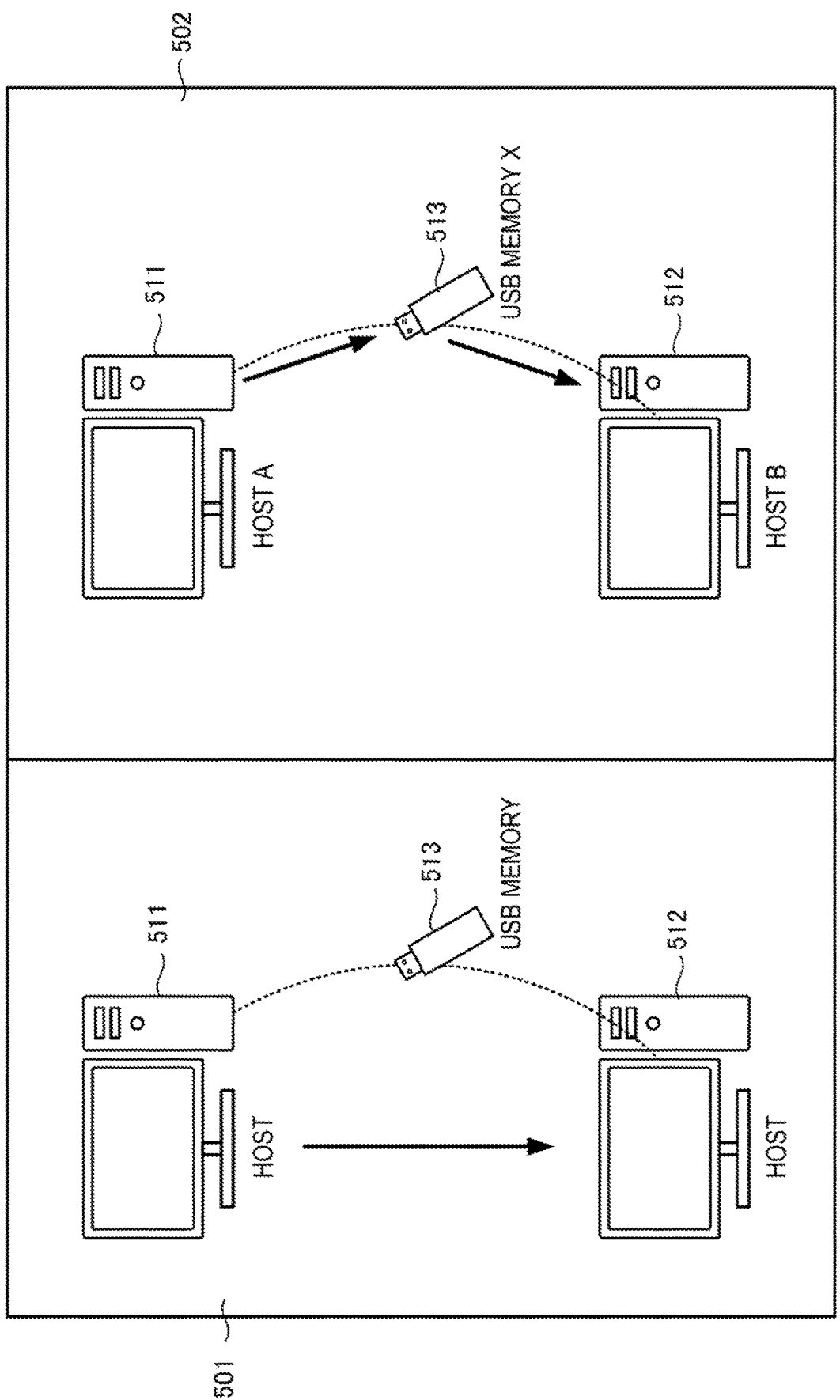
FIG. 5 is a view for determining an air gap path by regarding an air gap path component as a host in the security assessment system according to the second example embodiment of the present invention.

Consider a case in which a USB memory 513 is connected to hosts 511 and 512 as in a case 501 or 502 shown in FIG. 5. At this time, as shown in the case 501, it is possible to make the user input an air gap path by considering the USB memory 513 as the air gap path component 203 and assuming the existence of the air gap path between the hosts 511 and 512. On the other hand, as shown in the case 502, it is possible to make the user input air gap paths by considering the USB memory 513 as a host, and assuming the existence of the air gap paths between the host 511 and the USB memory 513 and between the USB memory 513 and the host 512. In the case 502, each of the air gap paths between the host 511 and the USB memory 513 and between the USB memory 513 and the host 512 is an air gap path with no air gap path component.

The security assessment unit 313 performs security assessment based on the pieces of information notified from the system configuration detector 311 and the air gap path scoring unit 315. The security assessment unit 313 has at least a function of extracting an attack path from a given host to another host and a function of calculating scoring information for quantitatively evaluating the attack path. As a simple method of extracting an attack path, if host A can reach host B by following the communication links on the network and the air gap paths, and some function of host B can be used illegally, all paths along which host A reaches host B can be extracted as an attack path from host A to host B.

In scoring of an attack path, the sum or the minimum value of the scores of the normal paths and air gap paths included in the path can be set as the score of the attack path. At this time, as the score of the air gap path, a value notified from the air gap path scoring unit 315 is used.

With respect to the normal path, a score can be calculated, similar to the existing security assessment system. As a typical method, the CVSS (Common Vulnerability Scoring System) scores of vulnerability of the host can be used. The CVSS scores include a base score, temporal score, and environmental score, and any of them may be used. In this specification, these scores will be referred to as CVSS scores without discriminating them from each other. With respect to each host, an OS or software operating on the host is specified by an input from the user, a port scan, stack fingerprinting, or the like. After that, vulnerability of each OS or software and its CVSS values are examined based on information open on the Web. The normal path can be scored by setting a highest one of the CVSS values as the score of the path connected to the host.

As a simpler method, the score of the normal path may be set to a predetermined fixed value or may be determined based on an element other than the CVSS values. Alternatively, the score of the normal path may be calculated using the existing security assessment system.

Note that the security assessment unit 313 is not limited to the above-described functions. The security assessment unit 313 can appropriately be combined with an assessment method used in the existing security assessment system.

The connection history storage unit 314 stores the connection information of the air gap path component 203 collected from the air gap path information collection client 302 by the air gap path detector 312. The stored information is used in subsequent processing by the air gap path detector 312 and the air gap path scoring unit 315.

The air gap path scoring unit 315 calculates a score representing the possibility that the air gap path notified from the air gap path detector is used for an attack, and notifies the security assessment unit 313 of the score together with the air gap path information. The score is calculated based on the connection information of the air gap path component 203 collected by the air gap path information collection client 302 and stored in the connection history storage unit 314 by the air gap path detector 312. This example embodiment explains an example of performing scoring based on the connection frequency of the air gap path. Scoring based on information other than the connection frequency will be described as a modification later.

It can be said that the air gap path with a high connection frequency is highly likely used for an attack since a time during which malware needs to hide is short.

When performing scoring based on the connection frequency of the air gap path, the air gap path information collection client 302 collects, as additional information concerning connection of the air gap path component 203, the time stamp of time at which the air gap path component 203 is connected, and includes it in connection information.

The air gap path scoring unit 315 calculates the connection frequency of the air gap path based on information of the time stamp included in the connection information stored in the connection history storage unit 314. To do this, the number of times the air gap path component 203 is connected during a unit period is examined for each host included in the air gap path to be scored and the average of the numbers of times is calculated.

Figure 6:
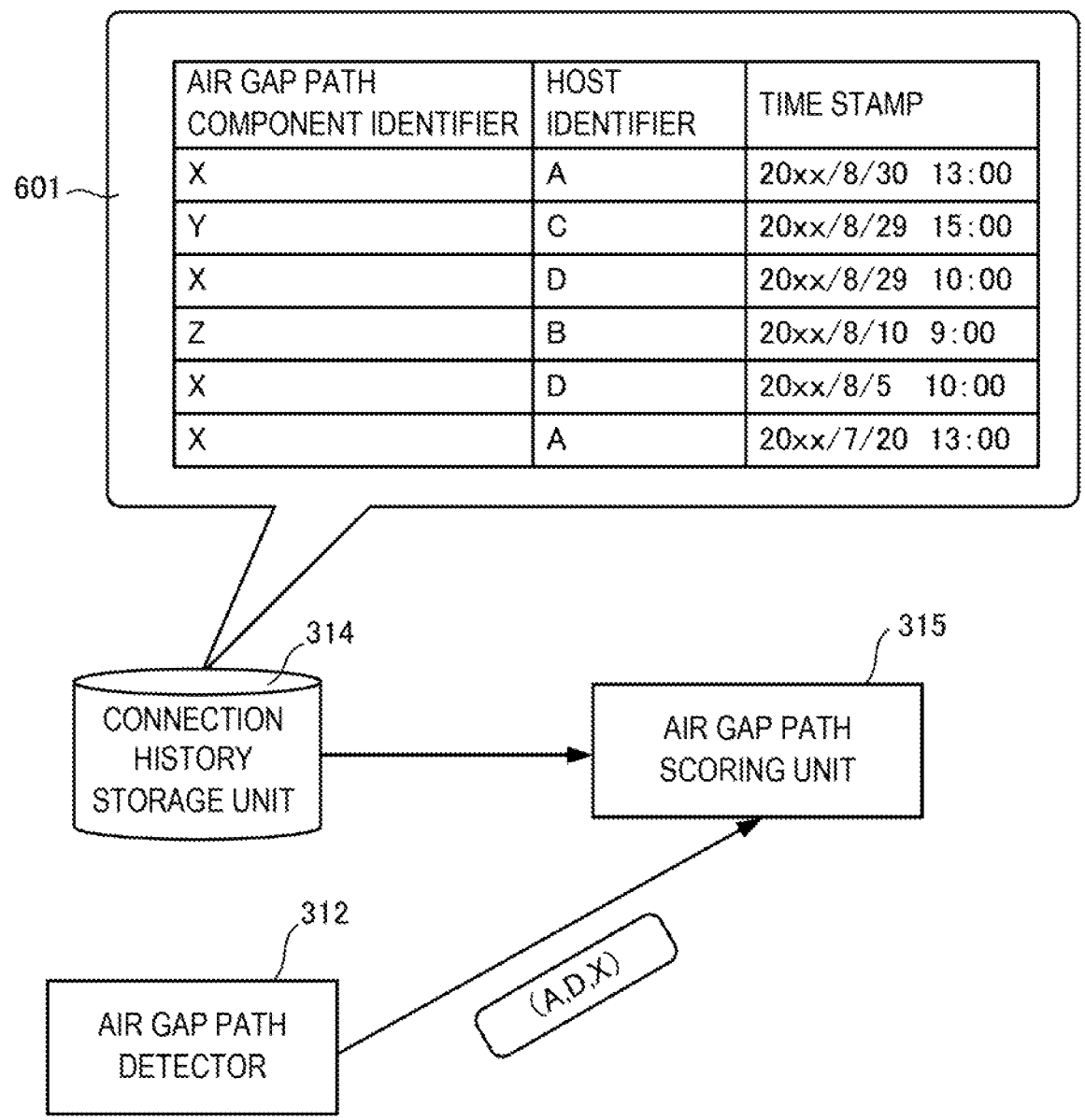
FIG. 6 is a view showing the practical flow of information between an air gap path detector and an air gap path scoring unit according to the second example embodiment of the present invention.

Consider, for example, a case in which while connection information 601 shown in FIG. 6 is stored in the connection history storage unit 314, the air gap path detector 312 makes a notification of air gap path information indicating that hosts A and D are connected by air gap path component X. Assume that a unit period for calculating the connection frequency is one month and processing is performed on Aug. 31, 20xx. In this case, air gap path component X is connected to host A once and to host D twice within the past one month. In this case, the connection frequency is 1.5.

Note that the connection frequency can also be calculated by another method. For example, the number of times the air gap path component 203 is connected during a unit period is examined for each host included in the air gap path, and the minimum value (one in the example shown in FIG. 6) or the total (three in the example shown in FIG. 6) of the numbers of times can be set as the connection frequency.

For example, in the example shown in FIG. 6, the number of times air gap path component X is connected within the past one month is three, that is, 8/30 13:00 host A, 8/29 10:00 host D, and 8/5 10:00 host D. The total value indicates the total of the numbers of times the air gap path component is connected to the hosts, and is thus three. The air gap path component 203 is connected to host A once, and to host D twice, the minimum value of the numbers of times of the two connected hosts is one of host A, and thus the minimum value is one.

The minimum value of periods each from when the air gap path component 203 is connected to a given host until the air gap path component 203 is connected to the host next time may be obtained, and then the frequency may be calculated based on the value. In addition to information during one unit period, the connection frequency may be calculated by going back to the past. That is, the connection frequencies for a plurality of unit periods can be calculated, and the average of the connection frequencies can be calculated.

The air gap path scoring unit 315 calculates a score based on the calculated connection frequency, and notifies the security assessment unit 313 of it. At this time, as the connection frequency is higher, the score is made higher (indicating that the possibility of use for an attack is higher).

Simply, the security assessment unit 313 is notified of the value of the connection frequency intact. Alternatively, the value of the connection frequency may be scaled to fall within a given range. For example, if the connection frequency is equal to or smaller than a given threshold Th1, it is scaled to 0. If the connection frequency is equal to or larger than another threshold Th2, it is scaled to 10. If the connection frequency is between Th1 and Th2, it can be scaled linearly. By scaling the score to fall within the range of 0 to 10, it is possible to obtain a merit that it is easy to compare the score with the CVSS values.

(Processing Procedure)

FIG. 7 shows a processing procedure according to this example embodiment. Note that processing shown in FIG. 7 can be performed by appropriately interchanging the order.

In step S701, the security assessment server 301 performs system configuration detection processing to obtain information of a system configuration (the connection relationship between the hosts).

In step S702, if connection information 700 of the air gap path component is obtained from the air gap path information collection client 302, the air gap path detector 312 performs connection information recording processing to save the connection information 700 of the air gap path component in the connection history storage unit 314.

In step S703, in air gap path detection processing based on the connection information, as explained in the description of the configuration, the information of the host to which the air gap path component was connected in the past is obtained from the connection history storage unit 314, the air gap path is recognized, and the air gap path scoring unit 315 is notified of it.

In step S704, score calculation processing of the air gap path is performed. The air gap path scoring unit 315 calculates the score of the air gap path notified from the air gap path detector, and notifies the security assessment unit 313 of the score.

Lastly, in step S705, the security assessment unit 313 performs security assessment processing to extract an attack path including the air gap path and performs scoring.

Note that after the security assessment processing ends, the state transitions to a state of waiting for reception of the next connection information 700 of the air gap path component (the process returns to step S702).

Note that the security assessment server 301 may repeatedly execute the processes in steps S702 to S705 every time the connection information 700 of the air gap path component is obtained, or the connection information 700 of the air gap path component may be buffered and then the processes in steps S702 to S705 may be executed every time a predetermined number of pieces of connection information 700 are collected.

Figure 8:
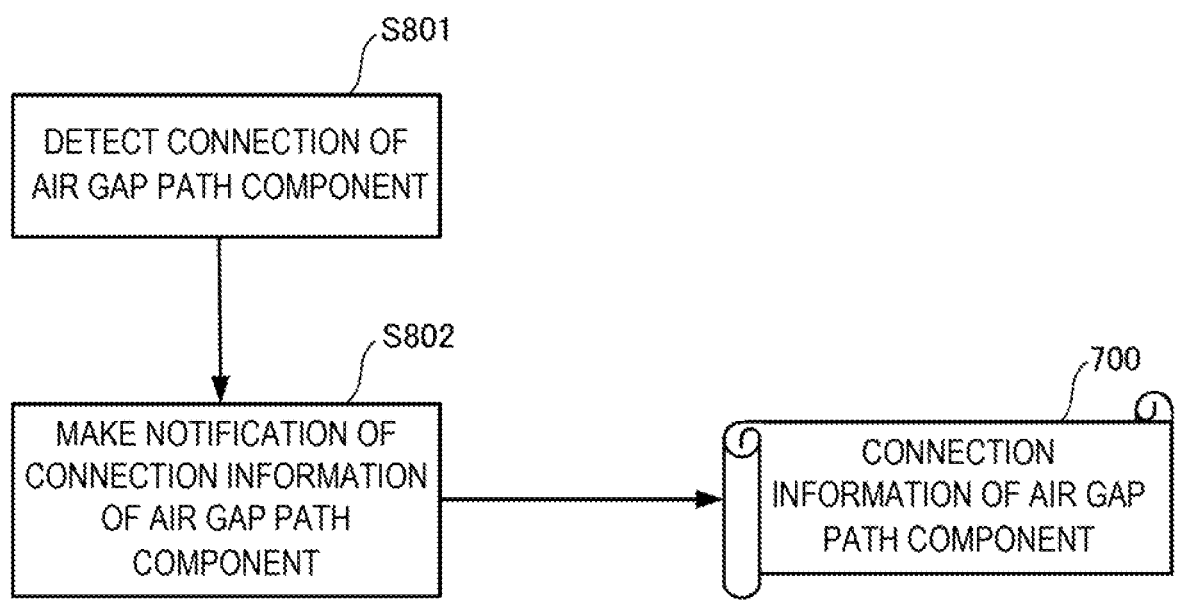
FIG. 8 is a flowchart illustrating the processing procedure of the security assessment system according to the second example embodiment of the present invention.

FIG. 8 shows an example of the operation of the air gap path information collection client 302. As shown in FIG. 8, upon detecting connection of the air gap path component (S801), the air gap path information collection client 302 notifies the air gap path detector 312 of the connection information 700 of the air gap path component (S802).

The air gap path scoring unit 315 can also perform scoring of the air gap path based on information other than the connection frequency. For example, scoring can be performed based on the connection time of the air gap path component 203. As the connection time of the air gap path component 203 is longer, the possibility that transfer of malware between the host and the air gap path component 203 succeeds is higher, and thus the possibility of use for an attack is also higher.

In this case, the air gap path information collection client 302 collects information of the connection time of the air gap path component 203, includes it in connection information, and notifies the air gap path detector 312 of the connection information.

The air gap path scoring unit 315 calculates the connection time of the air gap path component 203 for each air gap path from the connection information stored in the connection history storage unit 314. To do this, the connection time of the air gap path component 203 during a unit period is examined for each host included in the air gap path to be scored, and the average of the times is calculated.

Similar to the case of the connection frequency, the connection time can be calculated by another method. For example, the connection time of the air gap path component 203 during a unit period can be examined for each host included in the air gap path, and the minimum value or the total of the times can be set as the connection time. In addition to information during one unit period, the connection time may be calculated by going back to the past. That is, the connection times for a plurality of unit periods can be calculated, and the average of the connection times can be calculated.

The air gap path scoring unit 315 calculates a score to be higher as the connection time is longer, and notifies the security assessment unit of the score. Simply, the security assessment unit 313 is notified of the value of the connection time intact. Alternatively, the value of the connection time may be scaled to fall within a given range. For example, if the connection time is equal to or shorter than a given threshold Th1, it is scaled to 0. If the connection time is equal to or longer than another threshold Th2, it is scaled to 10. If the connection time is between Th1 and Th2, it can be scaled linearly.

As another example, the air gap path can be scored based on the number of hosts connected to the air gap path component 203. The air gap path component 203 may be connected to three or more hosts. However, the number of hosts connected to the air gap path component 203 is larger, the possibility of an attack is higher. That is, the air gap path scoring unit 315 calculates a score to be higher as the number of connected hosts is larger.

More specifically, if the air gap path detector 312 notifies the air gap path scoring unit 315 of the air gap path information, the air gap path scoring unit 315 examines, based on the connection information stored in the connection history storage unit 314, the number of hosts, to which the air gap path component 203 was connected in the past, included in the information.

A score is calculated to be higher as the number of hosts connected in the past is larger, and the security assessment unit 313 is notified of it. Simply, the security assessment unit 313 is notified of the value of the number of hosts intact. Alternatively, the value of the number of hosts may be scaled to fall within a given range. For example, if the number of hosts is equal to or smaller than a given threshold Th1, it is scaled to 0. If the number of hosts is equal to or larger than another threshold Th2, it is scaled to 10. If the number of hosts is between Th1 and Th2, it can be scaled linearly.

For example, if connection information 900 of the air gap path component shown in FIG. 9 is saved in the connection history storage unit 314, it is found that the air gap path component X is connected to three hosts and air gap path component Y is connected to two hosts. In this case, air gap paths (A-D, D-E, and A-E) connected by air gap path component X has scores higher than that of an air gap path (B-C) connected by air gap path component Y.

As another example, a score can also be calculated based on the type of the air gap path component 203. There are variations of malware such as malware configured to attack vulnerability of the USB memory and malware which infects not a simple storage medium but a smartphone. Thus, it is considered that the possibility of an attack changes depending on the type of the air gap path component 203.

In this case, the air gap path information collection client 302 also collects the information of the type of the air gap path component 203, includes it in connection information, and notifies the air gap path detector 312 of the connection information. The score of each air gap path component 203 is held in advance in the air gap path scoring unit 315. The air gap path scoring unit notifies the security assessment unit 313 of the score corresponding to the type included in the notified connection information of the air gap path. Typically, the scores for the types of the air gap path components 203 may be all input by the user.

The scores for each type of the air gap path component 203 can be determined based on the feature of the air gap path component. For example, it is possible to set a low score for a simple storage medium such as a memory card or an external hard disk, and a high score for a computer such as a smartphone or a laptop computer.

Furthermore, in cooperation with an intra-asset management system, extension may be performed to determine whether the air gap path component 203 is owned by a company or owned privately. Then, if the air gap path component 203 is owned by a company, the score can be set low. If the air gap path component 203 is owned privately, the score can be set high. If the air gap path component 203 is owned privately, it may have already been infected with malware, and may easily be infected with malware newly.

Extension can also be performed to perform scoring based on information of each model or a company which has manufactured the air gap path component 203 in addition to the type of the air gap path component 203. Furthermore, scoring can be performed based on vulnerability information of the air gap path component 203. For example, a score may be set higher as the number of vulnerabilities of the air gap path component 203 is larger, or the CVSS values of vulnerabilities of the air gap path component 203 may be used as scores.

Figure 10:
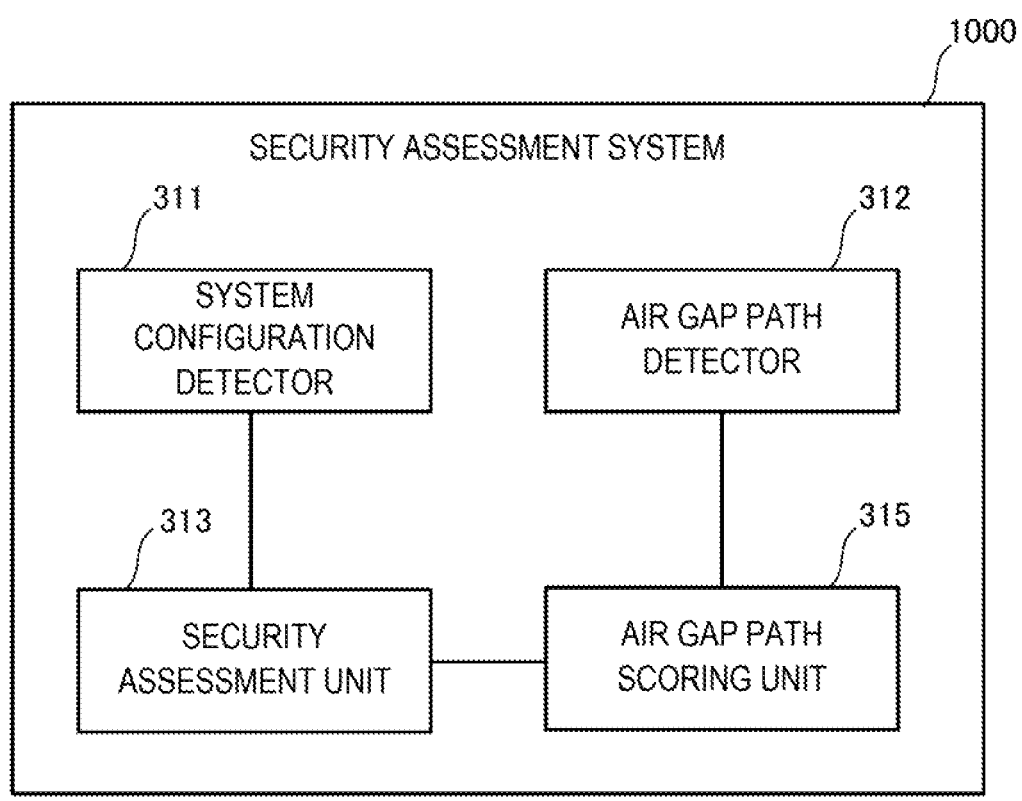
FIG. 10 is a block diagram showing the configuration of the security assessment system according to a modification of the second example embodiment of the present invention.

As a modification, the connection information can be collected without using the air gap path information collection client 302. For example, air gap path connection information may be obtained from an operation manual or system specifications. It can be configured to make the user input air gap path connection information. In this case, by providing a function of collecting air gap path connection information in the air gap path detector 312 and the air gap path scoring unit 315, a security assessment system 1000 can be configured, as shown in FIG. 10.

According to this example embodiment, it is possible to calculate, based on the characteristics (the connection frequency, the connection time, the number of connected hosts, and the type of the air gap path component) of an air gap path, the possibility that the air gap path is used for an attack.

Third Example Embodiment

A security assessment system according to the third example embodiment of the present invention will be described next with reference to FIG. 11 and subsequent drawings. A security assessment system 1100 according to this example embodiment is different from the above-described second example embodiment in that a peripheral environment information collection client 1103 and an environment information storage unit 1116 are provided. The remaining components and operations are similar to those in the second example embodiment. Hence, the same reference numerals denote the similar components and operations, and a detailed description thereof will be omitted.

In this example embodiment, an air gap path is scored based on information of the peripheral environment of the air gap path, such as hosts connected to the air gap path. Since, as described above, the air gap path is only temporarily connected, malware needs to hide in a host connected to the air gap path in a system to spread infection via the air gap path. Depending on the security measures of the hosts on the periphery of the air gap path, it may be difficult for malware to hide in the system until the air gap path is connected. That is, it can be effective to use the peripheral environment information (especially, security measure information) of the air gap path for scoring of the possibility that the air gap path is used for an attack.

(Configuration of Security Assessment System)

The air gap path scoring unit 1115 obtains information for scoring an air gap path not from a connection history storage unit 314 but from the peripheral environment information collection client 1103.

Information in the connection history storage unit 314 is not always necessary for scoring of the air gap path scoring unit 1115. That is, information stored in the connection history storage unit 314 need not be provided to the air gap path scoring unit 1115. Furthermore, air gap path information of which an air gap path detector 312 notifies the air gap path scoring unit 1115 need not always include the identification information of an air gap path component 203.

Figure 11:
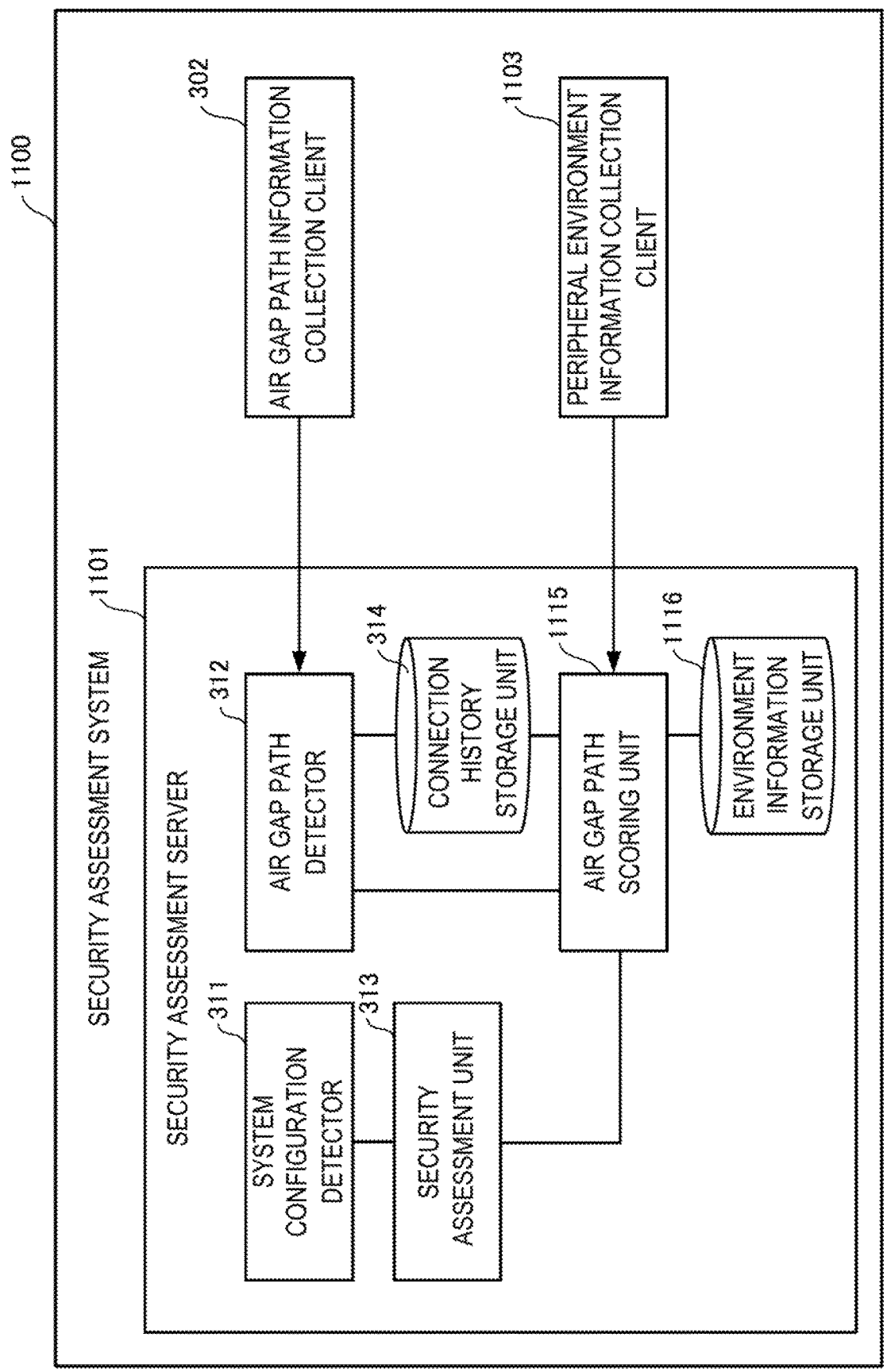
FIG. 11 is a block diagram showing the configuration of a security assessment system according to the third example embodiment of the present invention.

Note that although an air gap path information collection client 302 and the peripheral environment information collection client 1103 are separately shown in FIG. 11, in fact, they can be implemented as single software that integrates the information collection functions of these functional units.

The air gap path scoring unit 1115 scores an air gap path based on the peripheral environment information of the air gap path, especially information concerning the security measures notified from the peripheral environment information collection client 1103. This example embodiment will explain an example of collecting information of the update frequencies of the hosts as peripheral environment information and performing scoring based on the information.

Vulnerabilities discovered in software or an operating system (OS) are often modified by updating the software or the OS. Thus, a device with a lower update frequency does not take measures against the vulnerabilities for a longer period. An air gap path connected to such host is considered to be easily used for an attack.

For the sake of simplicity, an example of performing scoring based on update information of the OS will be described below. However, the present invention is not limited to the update information of the OS, and update information of other software, firmware, or middleware may be used.

The peripheral environment information collection client 1103 is typically agent software installed in a host. The peripheral environment information collection client 1103 records the update frequency of the OS of the host as peripheral environment information, and notifies the air gap path scoring unit 1115 of it for each unit period. At this time, the notified information includes information of the OS update frequency of the host and the identification information of the host.

The air gap path scoring unit 1115 saves the notified peripheral environment information in the environment information storage unit 1116. Furthermore, if the air gap path detector 312 notifies the air gap path scoring unit 1115 of air gap path information, the air gap path scoring unit 1115 extracts, based on the pieces of identification information of hosts included in the air gap path information, the update frequencies of the hosts from the environment information storage unit 1116. A score is calculated so that the score becomes higher as the update frequencies of both the hosts are lower, and the security assessment unit is notified of it.

As a simple method, the average of the update frequencies of both the hosts is set as the update frequency of the air gap path, and a value obtained by subtracting the update frequency from a predetermined value is calculated as a score. Alternatively, the value of the update frequency of the air gap path may be scaled to fall within a given range. For example, if the update frequency is equal to or higher than a given threshold Th1, it is scaled to 0. If the update frequency is equal to or lower than another threshold Th2, it is scaled to 10. If the update frequency is between Th1 and Th2, it can be scaled linearly. As the update frequency of the air gap path, the maximum or minimum value of the update frequencies of both the hosts may be used, or the total of the update frequencies can be used.

The environment information storage unit 1116 has a function of saving peripheral environment information used by the air gap path scoring unit 315 to calculate the score of the air gap path.

(Processing Procedure)

FIG. 12 is a flowchart illustrating the processing procedure of a security assessment server 1101 according to this example embodiment. The same reference symbols as in the second example embodiment denote similar processes and a description thereof will be omitted.

After system configuration detection processing (S701), upon receiving peripheral environment information 1200 from the peripheral environment information collection client 1103, the air gap path scoring unit 1115 of the security assessment server 1101 performs peripheral environment information recording processing (S1202) to record the information in the environment information storage unit 1116.

After air gap path detection processing (S703) based on connection information, in step S1204 an air gap path scoring unit 315 calculates the score of the air gap path based on information included in the environment information storage unit 1116, and notifies a security assessment unit 313 of it.

Note that although not shown in FIG. 12, the peripheral environment information recording processing (S1202) may be performed a plurality of times before the air gap path detection processing (S703) based on the connection information.

Figure 13:
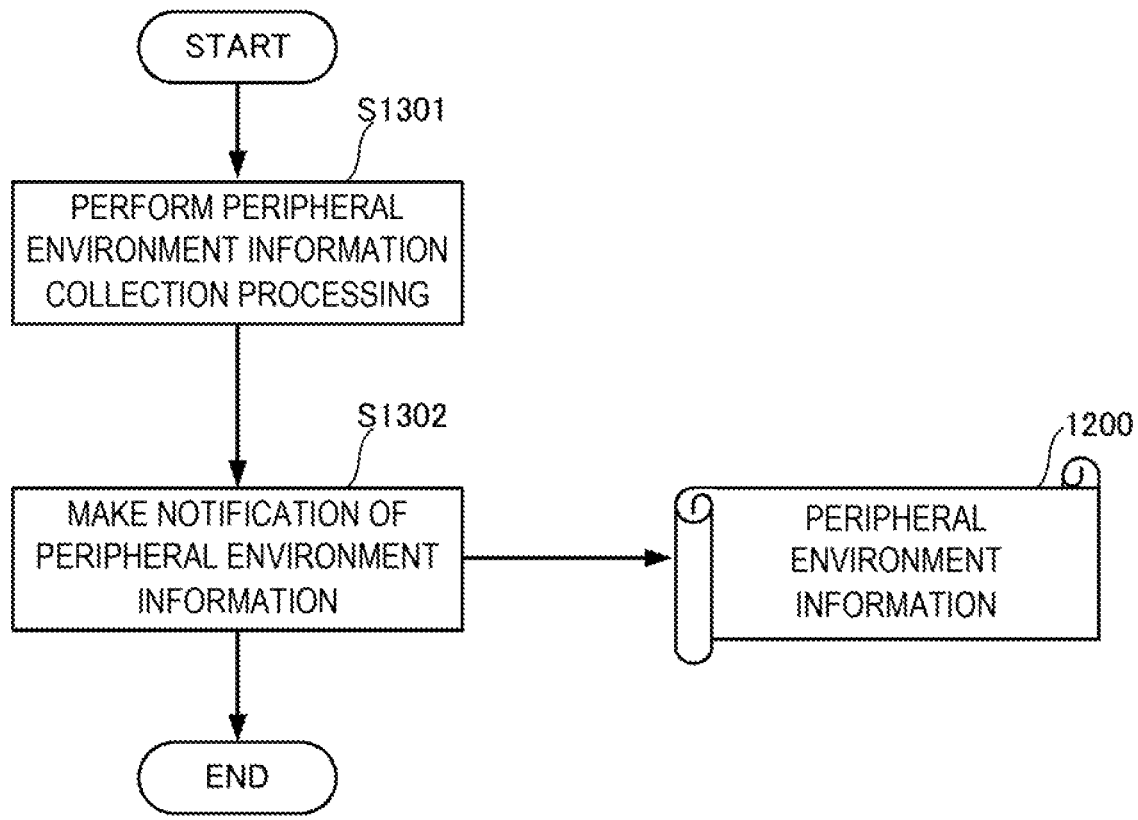
FIG. 13 is a flowchart illustrating the processing procedure of the security assessment system according to the third example embodiment of the present invention.

FIG. 13 is a flowchart illustrating the operation of a peripheral environment information collection client 1103. The peripheral environment information collection client 1103 collects peripheral environment information in step S1301, and then notifies, in step S1302, the security assessment server 1101 of the collected peripheral environment information 1200.

(Variations of Environment Information and Scoring Method)

As for the collected peripheral environment information and the scoring method, there exist various variations. For example, instead of the update frequency of the OS, information of the security check frequency or reactivation frequency of the host can be collected. In this case, similar to the case of the update frequency of the OS, the score of an air gap path connected to hosts is calculated so that the score becomes higher as the security check frequencies or reactivation frequencies of the hosts are higher. As a practical calculation method, the same method as that in the case of the update frequency of the OS is used.

Contents of security measures installed in the hosts can also be collected. For example, it may be checked whether white list security measures are taken. If white list security measures are taken, the score may be set high.

The peripheral environment information of the air gap path is not limited to the pieces of information of the hosts connected to the air gap path. It is also possible to obtain pieces of information from hosts on the periphery of the hosts connected to the air gap path. For example, pieces of information may be collected in the same manner from adjacent hosts within a predetermined number of hops from the hosts connected to the air gap path. If the collected information is frequency information such as an update frequency, security check frequency, or reactivation frequency, the score can be calculated based on the average, maximum, or minimum value of all the hosts.

It is also possible to calculate the score based on the layout of an IDS (Intrusion Detection System)/IPS (Intrusion Prevention System) or FW (Fire Wall). For example, if at least one of the hosts connected to the air gap path is connected to an external network without intervention of the IDS/IPS or FW, malware hiding in the host can perform a behavior of sequentially communicating with the external network and updating the code of itself. That is, the possibility that the air gap path connected to such host is used for an attack becomes high.

In this case, assuming that the peripheral environment information collection client 1103 is installed in all the hosts, the air gap path scoring unit 315 is notified of the position of the IDS/IPS or FW as peripheral environment information. The air gap path scoring unit 315 determines whether the host is connected to the external network without intervention of the IDS/IPS or FW based on the notified information and the information obtained by the system configuration detector. If the host is connected to the external network without intervention of the IDS/IPS or FW, the score of the air gap path connected to the host is calculated high.

Furthermore, the example embodiments and modifications described in this specification can be implemented in combination appropriately. It is particularly effective to combine the second and third example embodiments. As described above, in order for malware to spread infection using the air gap path, the malware needs to hide in the host until the air gap path is connected. If the malware is discovered and disinfected before the air gap path is connected, it cannot spread infection.

Therefore, it can be said that the relationship between the characteristic concerning connection of the air gap path such as the connection frequency of the air gap path component 203 and the peripheral environment information such as the update frequency or security check frequency of the host largely influences the possibility that the air gap path is used for an attack.

For example, while collecting information of the connection frequency of the air gap path component 203 as in the second example embodiment, pieces of information of the security check frequencies of the hosts connected to the air gap path can be collected as in the second example embodiment. After that, the score can be calculated based on the relationship between the connection frequency and the security check frequency. More specifically, as the connection frequency is higher with respect to the security check frequency, the score is set higher. For example, the air gap path scoring unit 315 can calculate the score so that the score becomes higher as a value obtained by dividing the connection frequency by the security check frequency is larger.

Although this example embodiment has explained the example of collecting the peripheral environment information using the peripheral environment information collection client 1103, the present invention is not limited to this. The peripheral environment information can be collected by another method. For example, the peripheral environment information may be collected from an operation manual or system specifications. It is also possible to make the user input the peripheral environment information. As in the second example embodiment, the air gap path information collection client 302 can be eliminated by providing the air gap path detector with a function of collecting air gap path connection information. That is, this example embodiment as well can be written as in FIG. 10, as a simple configuration.

According to this example embodiment, it is possible to calculate the score of an air gap path based on pieces of information (especially, security measure information) of hosts connected to the air gap path and their peripheral hosts. That is, more correct scoring of the air gap path is possible.

Fourth Example Embodiment

A security assessment system according to the fourth example embodiment of the present invention will be described next with reference to FIG. 14. A security assessment system 1400 according to this example embodiment is different from the above-described second example embodiment in that a score is calculated by a different method for each air gap path detection method. The remaining components and operations are similar to those in the second example embodiment. Hence, the same reference numerals denote the similar components and operations, and a detailed description thereof will be omitted.

Examples of the air gap path detection method are a method of "extracting all paths between hosts that can be air gap paths" and a method of "extracting only an air gap path whose connection is actually confirmed". Depending on these detection methods (detection policies), the possibility that the air gap path is actually used for an attack is different.

(System Configuration)

FIG. 14 shows the schematic arrangement of the security assessment system 1400 according to this example embodiment. An air gap path detector 1402 includes a plurality of air gap path detection methods 1421. Upon detecting an air gap path, the air gap path detector 1402 notifies an air gap path scoring unit 1405 of not only air gap path information but also the detection method 1421.

The air gap path detector 1402 need only include the plurality of air gap path detection methods 1421. In the explanation of this example embodiment, as a typical example, the air gap path detector 1402 is assumed to include three detection methods for implementing the following detection policies, respectively.

Detection policy 1: detecting an air gap path whose existence is actually confirmed on a system Detection policy 2: detecting an air gap path that may be generated during an operation Detection policy 3: detecting an air gap path that may be generated by a user (including a malicious inside criminal) with physical access authority to all the hosts Air gap path detection with detection policy 1 can be implemented by the method described in the second example embodiment. Although not shown in FIG. 14, an air gap path information collection client 302 and a connection history storage unit 314 are provided and an air gap path is detected in the same manner as in the second example embodiment.

Detection policy 2 is implemented by reading an air gap path from a document such as an operation manual or system specifications. Pieces of information of hosts and information of an air gap path component 203 are read from the operation manual. As a simple method, data of a word that may indicate a host and data of a word that may indicate the air gap path component 203 are held, and a sentence including the host or the air gap path component 203 is extracted from the operation manual. If there is an area where two or more hosts and one or more air gap path components 203 are included in a close range (for example, one sentence or one paragraph) in the sentence, detection is performed by assuming the existence of the air gap path between the hosts.

The detection policy 3 is also implemented by reading an air gap path from a document such as an operation manual or system specifications. Detection policy 3 can be implemented by detecting an air gap path by assuming the existence of the air gap path between the hosts with physical interfaces of the same type existing in the system. That is, the physical interface of each host is extracted from the document concerning the system specifications, and air gap paths are detected by assuming the existence of the air gap paths between all the hosts with the interfaces of the same type.

As described above, the air gap path detector 1402 can include the plurality of air gap path detection policies and detection methods.

Note that the respective detection policies and detection methods are merely examples, and the present invention is not limited to them. As a simpler detection method, an interface that can make the user input an air gap path and accept such input for all the policies may be provided in the security assessment system.

Upon detecting an air gap path, the air gap path detector 1402 notifies the air gap path scoring unit 1405 of the detection method or detection policy together with information of the air gap path.

The air gap path scoring unit 1405 calculates the score of the simultaneously notified air gap path based on the notified detection method or detection policy. As a simple method, a score can be determined in advance for each detection method or detection policy, and the air gap path scoring unit 315 can hold the value in advance. The air gap path scoring unit 315 notifies a security assessment unit 313 of the calculated score.

(Processing Procedure)

Figure 15:
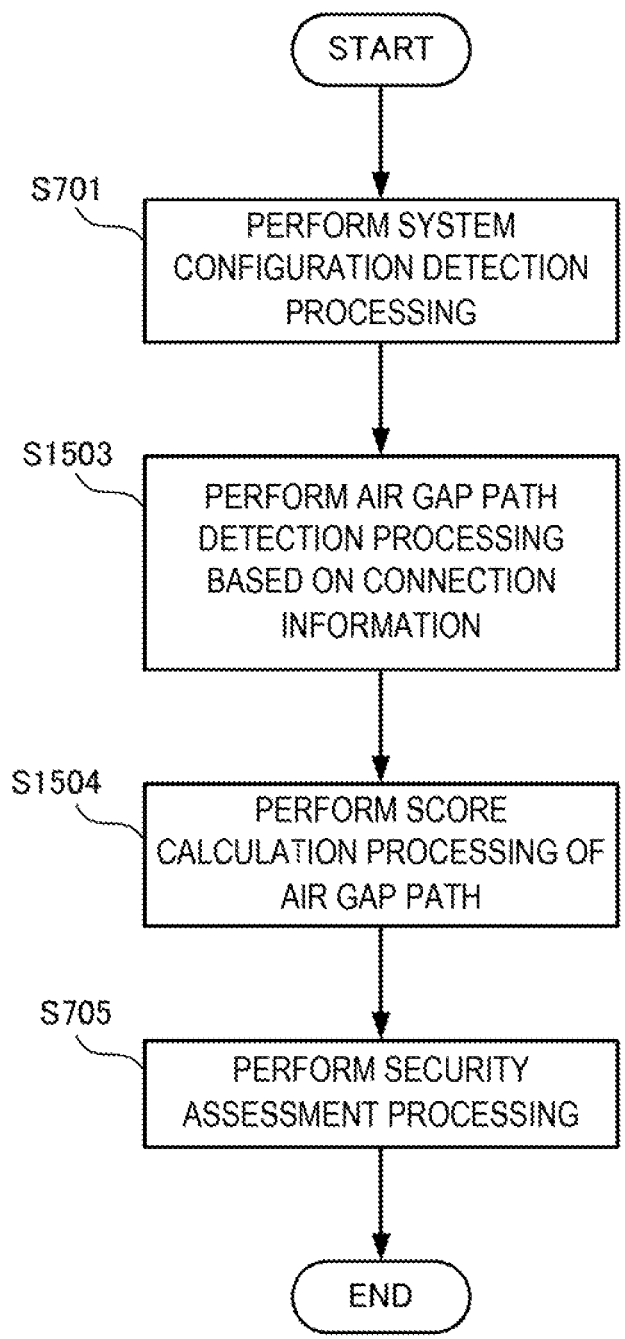
FIG. 15 is a flowchart illustrating the processing procedure of the security assessment system according to the fourth example embodiment of the present invention.

FIG. 15 is a flowchart illustrating the processing procedure of the security assessment system 1400 according to this example embodiment. The same reference symbols as in the second example embodiment denote similar processes and a description thereof will be omitted.

After system configuration detection processing (S701), upon receiving peripheral environment information 1200 from the peripheral environment information collection client 1103, the air gap path scoring unit 1405 performs peripheral environment information recording processing (S1202) to record the information in the environment information storage unit 1116.

After air gap path detection processing (S703) based on connection information, in step S1204 the air gap path scoring unit 315 calculates the score of an air gap path based on information included in an environment information storage unit 1116, and notifies the security assessment unit 313 of it.

After a system configuration detector 311 detects the system configuration in step S701, the air gap path detector 1402 detects, in step S1503, an air gap path by one or more of the plurality of air gap path detection methods 1421. After that, in step S1504, for the air gap path detected by the air gap path detector 1402, the air gap path scoring unit 1405 performs scoring based on the notified air gap path detection method 1421 or detection policy. In step S705, the security assessment unit 313 performs security assessment based on the pieces of information.

(Modifications and Supplements)

In some cases, the detection policy can be rephrased into air gap path detection sensitivity. That is, a detection method with higher sensitivity detects a larger number of potential air gap paths (paths each of which does not always become an air gap path actually but may become an air gap path). In this case, a score can be determined based on the sensitivity. An air gap path found by a detection method with lower sensitivity is scored higher.

According to this example embodiment, it is possible to score an air gap path based on an air gap path detection method (detection policy or sensitivity). That is, more correct scoring is possible.

(Other Supplements)

In some cases, the possibility that an air gap path is used for an attack, indicated by the score of the air gap path, can be rephrased into the degree of influence when used for an attack. For example, when scoring the air gap path based on the number of hosts connected to the air gap path component 203, as the number of hosts connected to the air gap path component 203 is larger, the influence when used for an attack can become larger. That is, the system can be considered as a system for scoring the degree of influence of the air gap path when used for an attack.

In the above description, the example embodiments and modifications do not consider the direction of an air gap path. However, extension can be performed to consider the direction of an air gap path. That is, the direction of an air gap path may be defined, and a score may be calculated for each direction. For example, if there exists an air gap path between hosts A and B and the OS update frequencies of both the hosts are obtained, it is possible to calculate a score from host A to host B based on the update frequency of host B and calculate a score from host B to host A based on the update frequency of host A.

Furthermore, the security assessment system can include an interface for designating or changing the score calculation method of the air gap path scoring unit 315 or a practical calculation formula.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing apparatus comprising:
a memory configured to store instructions; and
a processor configured to execute the instructions to:
detect at least two hosts included in a system and a communication link between the at least two hosts;
detect, among the at least two hosts, a pair of hosts between which there is no communication link but data movement can occur;
calculate a score concerning a possibility that the detected pair of hosts is used for an attack; and
perform security assessment using the at least two hosts, the communication link between the at least two hosts, information of the pair of hosts, and the score.

2. The information processing apparatus according to claim 1, wherein the processor is configured to execute the instructions to calculate the score based on at least one of
a connection frequency or a connection time between the hosts included the detected pair of hosts or between each host and an element that can cause the data movement to occur,
the number of hosts connected to the element that can cause the data movement to occur,
a type of the element that can cause the data movement to occur, and
a combination thereof.

3. The information processing apparatus according to claim 1, wherein the processor is configured to execute the instructions to calculate the score based on
security check frequencies of the hosts included in detected the pair of hosts or hosts on the periphery of the hosts,
reactivation frequencies of the hosts,
OS/software/firmware update frequencies of the hosts, or a combination thereof.

4. The information processing apparatus according to claim 1, wherein the processor is configured to execute the instructions to calculate the score based on a positional relationship between the hosts included in the pair of detected hosts and one of an IDS (Intrusion Detection System), an IPS (Intrusion Prevention System), and a firewall.

5. The information processing apparatus according to claim 1, wherein the processor is configured to execute the instructions to;

detect the pair of hosts in a detection method selected from a plurality of detection methods, and
calculate the score by a calculation method corresponding to the selected detection method.

6. An information processing system comprising:
an information processing apparatus defined in claim 2; and
a client apparatus configured to collect at least one piece of information of
a connection frequency or a connection time between hosts included in the detected pair of hosts or between each host and an element that can cause data movement to occur,
a number of hosts connected to the element that can cause the data movement to occur,
a type of the element that can cause the data movement to occur, and
a combination thereof.

7. An information processing system comprising:
an information processing apparatus defined in claim 3; and
a client apparatus configured to collect at least one piece of information of
security check frequencies,
reactivation frequencies,
update frequencies,
a positional relationship between the hosts included in the detected pair of hosts and one of an IDS (Intrusion Detection System), an IPS (Intrusion Prevention System), and a firewall, and
a combination thereof.

8. A security assessment method comprising:
detecting at least two hosts included in a system and a communication link between the at least two hosts;
detecting a pair of hosts between which there is no communication link but data movement can occur, among the at least two hosts;
calculating a score concerning a possibility that the pair of hosts detected in the detecting the pair of hosts is used for an attack; and
performing security assessment using the at least two hosts, the communication link between the at least two hosts, information of the pair of hosts, and the score.

9. A non-transitory computer readable medium storing a security assessment program for causing a computer to execute a method, comprising:
detecting at least two hosts included in a system and a communication link between the at least two hosts;
detecting a pair of hosts between which there is no communication link but data movement can occur, among the at least two hosts;
calculating a score concerning a possibility that the pair of hosts detected in the detecting the pair of hosts is used for an attack; and
performing security assessment using the at least two hosts, the communication link between the at least two hosts, information of the pair of hosts, and the score.

* * * * *